April 21, 1964

R. C. READ ETAL 3,130,074

DUSTING APPARATUS

Filed March 22, 1960

INVENTORS.
ROBERT C. READ
FRANK T. WARD

BY John P. Chandler

THEIR ATTORNEY.

April 21, 1964     R. C. READ ETAL     3,130,074
DUSTING APPARATUS

Filed March 22, 1960     2 Sheets-Sheet 2

INVENTORS.
ROBERT C. READ
FRANK T. WARD
BY John P. Chandler
THEIR ATTORNEY

3,130,074
DUSTING APPARATUS
Robert C. Read, Norwalk, and Frank T. Ward, Wilton, Conn., assignors to The Gordon Company, Inc., Norwalk, Conn., a corporation of Connecticut
Filed Mar. 22, 1960, Ser. No. 16,735
7 Claims. (Cl. 118—2)

This invention relates to bakery equipment and more particularly to dusting apparatus for dusting bakery products while they are being conveyed from one operation to the next.

Dusting apparatus is presently used in many types of bakery equipment where the dust is delivered to the area of application at predetermined rates. There are a great many instances, such as in the processing of dough balls, where the passage of the dough balls through the area of application is at irregular intervals due to factors such as dough condition, equipment malfunctions, operator inefficiency, and many others. It is obvious that under these conditions, delivery of powdered material at a continuous constant rate or even at under constant rate, would result in much waste of dusting material due to the frequent completely irregular periodic deliveries and different rates of passage of the bakery product passing through the dusting areas. The amount of dust thereby needlessly handled is very often a large percentage of the total, thus hampering efficiency and causing a burden on the equipment; the greatest burden being the consumption of operator's time in recharging the dust supply tank, emptying and screening dusting material which has returned through the recovery equipment, and recovering and reconditioning dust which dropped into the recovery drawers while no dough was in transit through the area of application.

It is therefore an object of the present invention to provide reservoir apparatus for accumulating a reserve of dusting material.

Another object is to provide means for control of the apparatus so as to permit continuous or intermittent distribution, or both, of the accumulating powdered material.

Another object is to provide control of the amount of powdered material delivered at each delivery.

Another object is to provide apparatus for directional control of such powder distribution.

Another object is to provide that the above objects are in turn regulated by control apparatus triggered by the dough units themselves in passage before they have entered spots or areas where it is desired to apply the powder.

One feature of the invention includes a reservoir to confine the dusting material and into which the powder is fed substantially at a predetermined quantity rate per hour.

The reservoir is positioned in a location which is calculated to be the best for the most efficient distribution of dust over the desired spots and areas. The bottom of the reservoir is sufficiently inclined to allow the dust to slide (by gravity) to the lowest point where air exhaust orifices are located. A source of compressed air is connected to the orifices through a control valve which is timed to operate only when dough balls have arrived at a point rearward of the initial area of application; such point being sufficiently rearward to provide time for the dust particles blown out of the reservoir, and dropping into the area of application, to arrive there simultaneously with the dough ball. When compressed air is admitted through the exhaust orifices it forces the dust, which has collected above it, through an opening, formed by the end wall of the reservoir and a vertical baffle plate, out into the air above the path of travel of the dough balls whence it settles upon the dough balls as they pass through. The baffle plate is located above the orifices but offset sufficiently toward the rear end wall of the reservoir to allow the compressed air to pass freely upwardly between the baffle and the front end wall of the reservoir, carrying the powder particles within it. The baffle also serves to restrain the bulk of dusting material within the reservoir but allows a variably controlled amount to pass between it and the bottom of the reservoir in the space above the orifices from which it is adjustably spaced apart.

For a better understanding of the present invention together with other and further objects thereof, reference is made to the following description taken in connection with the accompanying drawings wherein.

The invention, as illustrated, is embodied in a typical area lying between a "rounder" and a "proofer-elevator" (explained below) and showing only such parts as are necessary to make clear the operation of the invention.

Figure 1:
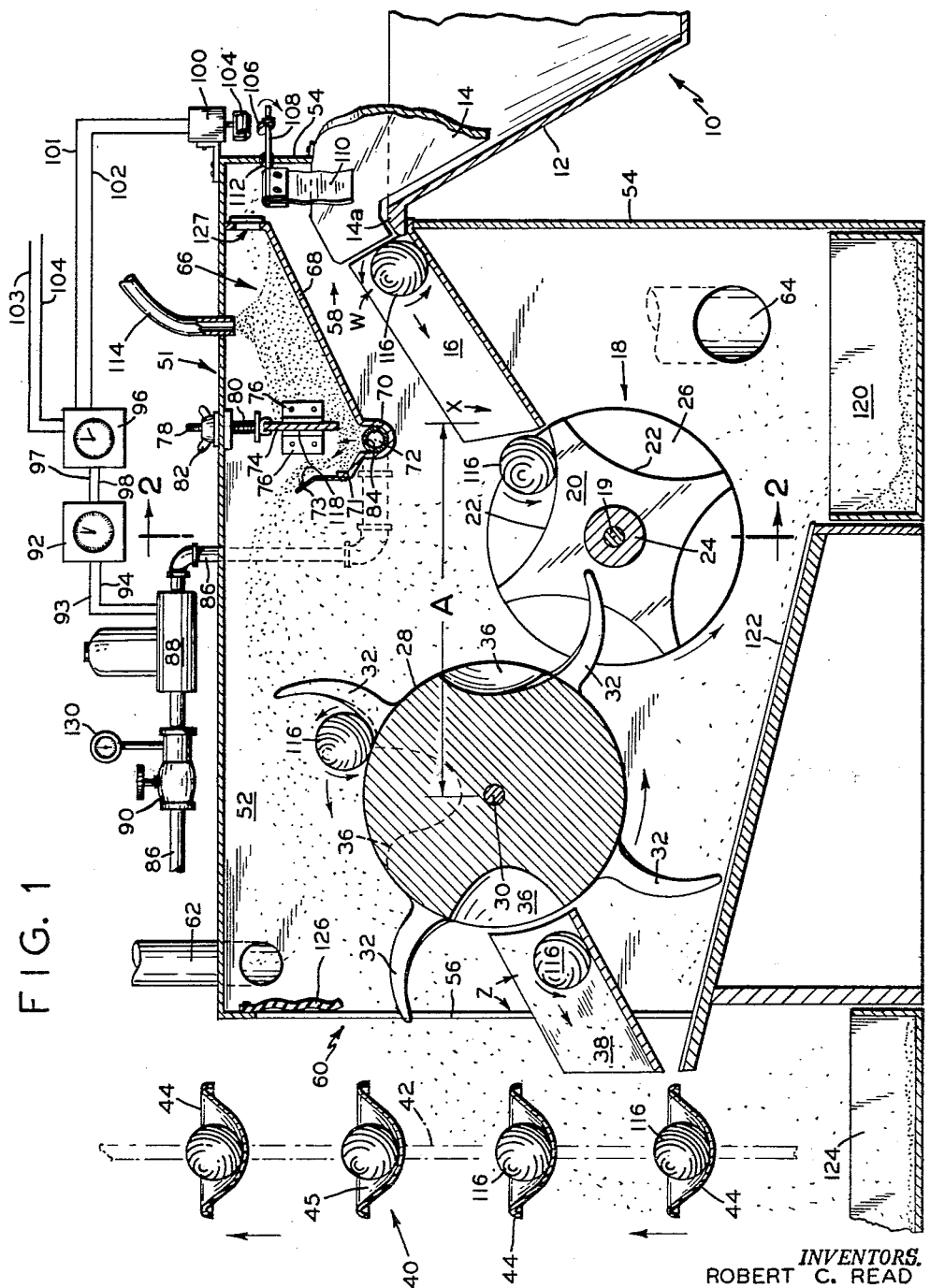
FIG. 1 is a sectional elevation of an application of the present invention, taken along line 1—1 of FIG. 2.
Figure 2:
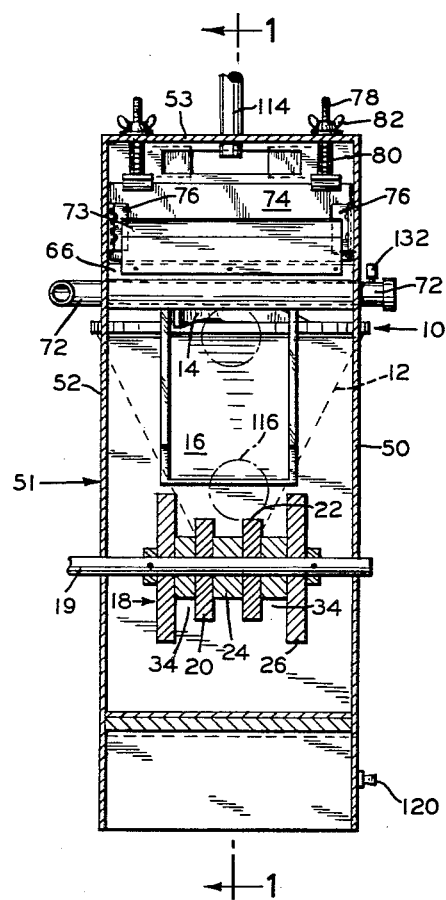
FIG. 2 is a sectional view taken along line 2—2 of FIG. 1.

Referring now to FIG. 1, a "rounder" 10 of the inverted cone type comprises a rotatable inverted cone 12 and an internal fixed spiral 14 which cooperate to knead the dough into balls. An inclined chute 16, leading from rounder 10, delivers the kneaded dough balls onto a wheel 18 mounted on a shaft 19. The wheel 18, rotatable as shown, is constructed of multiple plates 20 having curved depressions 22 to receive the dough balls. The plates 20 are separated by spacers 24 (FIG. 2). Two end discs 26 are also spaced apart from the plates 20 by spacers 24 and serve to prevent the dough balls from falling off the wheel 18. A second wheel 28 secured to a shaft 30, and rotatable as shown, is located adjacent the wheel 18 so that fingers 32 of the wheel 28 intermesh in spaces 34 (FIG. 2) formed by the spacers 24 (FIG. 2) between the plates 20 (FIG. 2) of the wheel 18. The wheel 28 is further provided with four curved cut out portions 36 which are properly inclined toward the periphery so as to cause each dough ball to roll therefrom, as the wheel 28 rotates, successively onto one of four parallel chutes 38; one of which is shown. A "proofer-elevator" 40 comprises a pair of parallel endless chains, the farther chain being shown at 42, which carry trays 44 between them. These trays 44 each contain 4 pockets 45 abreast. These 4 pockets 45 are aligned with the lower ends of the 4 chutes 38, from which they receive the dough balls. The dough balls in the trays 44 are carried by the endless chain elevator into an overhead "proofer" (not shown), in which the dough is "raised."

The area between the "rounder" and the "proofer-elevator" is enclosed by a hood 51 having a top 53 (FIG. 2), two sides 50 (FIG. 2) and 52 and end walls 54 and 56 (FIG. 1). An opening 58 in the end wall 54 accommodates the delivery end of the "spiral" 14 and an opening 60 in the end wall 56 allows passage of the dough balls out from the hood 51 by means of chute 38 into the trays 44. The hood 51 is constructed substantially air tight excepting for the openings 58 and 60, to prevent the leakage of dust therefrom into the surrounding space. There are two ducts 62 and 64 which connect the hood 51 with an exhausting device (not shown) which maintains the interior of the hood under a slight vacuum to further prevent leakage of dust to the outside of the hood.

A reservoir generally indicated 66 is constructed with an inclined bottom 68 extending between the side walls 50 (FIG. 2) and 52. The bottom 68 is fabricated with a depending channel section 70 at its lowest point to receive a pneumatic tube 72 which is positioned horizontally therein and extends transversely through the side walls 50 (FIG. 2) and 52. The bottom 68 extends beyond the channel section 70 to form an upturned lip 71. A fin 73 is attached to the lip 71 and its upper end is bent to directionally control the flow of dust-laden air. An adjustable baffle plate 74 slides vertically in slots between two sets of angle plates 76 mounted upon the side walls 52 and 50 (FIG. 2), to meter the quantity of dusting material which slides down the inclined bottom 68 to rest upon the tube 72. Two threaded rods 78 are attached to the top of the baffle plate 74 and extend through the top 53 (FIG. 2) of the hood 51. A spring 80 is carried concentrically by each rod 78 and urges the baffle plate 74 downwardly as far as thumb screw 82 will permit. The baffle plate is furthermore positioned above the tube 72, but offset rearwardly from the vertical centerline of the tube in order not to obstruct the upward flow of air and to form a passageway for dust-laden air 118 between the fin 73 and plate 74.

The tube 72 is provided with several orifices 84 to direct air jets substantially upwardly. The tube 72 further is connected by piping 86 to a solenoid operated valve 88, thence through a pressure regulating valve 90 to a source of compressed air (not shown). The solenoid valve 88 is controlled by an electric timer 92 through connecting wires 93 and 94. A second electric timer 96 controls the timer 92 through wires 97 and 98. The second timer 96 contains a holding switch which is energized by the closing of microswitch 100 through connecting wires 101 and 102. Current supply for both timers is provided from power source through wires 103 and 104. A roller 104' is attached to the plunger of the microswitch 100. A cam 106 which is attached to a shaft 108 cooperates with the roller 104' to actuate the microswitch 100. A flap 110 is fastened to the free end of the shaft 108 and descends into the passageway of the dough balls so that as a dough ball passes through, it strikes the flap 110, thus rotating the shaft 108 in a bearing 112 mounted in the side wall 54.

In operation dusting material, such as aerated starch powder, is delivered into the reservoir 66 at approximately a constant rate (which rate is adjustable by the operator) through a tube 114 from a supply source (not shown). The starch powder feeds, due to gravity, beneath the baffle plate 74 into the space above the tube 72. A dough ball 116 is ejected from the rounder 10 by means of the rotation of the rounder cone 12 which forces the dough ball up the spiral 14 and over the rounder lip 14a, whence it rolls down the chute 16 and onto the rotating wheel 18. As the dough ball 116, in passing into chute 16, hits the flap 110, thereby rotating the shaft 108 causing the cam 106 to push the roller 104 upwardly it closes the microswitch 100. This energizes the electric timer 96 which runs for a predetermined interval for which it has been set. This interval is approximately equal to the time required for the dough ball 116 to travel from flap 110 to position X, which is rearward of the area of application of starch A. At the end of this time interval the timer 96 energizes the timer 92 which, in turn, immediately energizes open the solenoid valve 88 to admit compressed air through piping 86 into the tube 72. From the tube 72 compressed air passes through the orifices 84 and out through the passageway 118 thus blowing starch powder out above the area of application A, whence it falls by gravity to cover the entire surface of the dough ball 116 as it is rolled through area of application by action of the wheels 18 and 28. The timer 92 keeps the solenoid valve 88 energized open for the predetermined interval of time required to insure delivery of starch powder by fallout onto the dough ball during, and only during, its transit of application area A.

When this predetermined interval of time has ended, timer 92 de-energizes solenoid valve 88 stopping the flow of air from tube 72 and the projection of starch powder into space above application area A. The space above tube 72 is immediately replenished with starch powder from the reservoir supply in reservoir 66, and is ready for the next cycle. Meanwhile, the wheels 18 and 28 also receive a protective coating of starch, which further prevents dough balls from sticking thereto. A portion of the ejected starch, directionally controlled by the flaps 73 and 126, is blown past wheel 28 protectively coating chutes 38 and pockets 45 in trays 44. Also, the air ejected from tube 72 momentarily produces a positive air pressure in the top of hood 51, resulting in a brief puff of starch laden air outward through opening 127 in the rear wall of reservoir 66 (such opening 127 being adjustable as to area to provide control), to protectively coat with starch dust the upper end of spiral 14, the lip 14a of the rounder 14 and the chute 16.

A starch collecting tray 120 is placed at the bottom of the hood 51 adjacent an inclined surface 122 down which residual starch slides into the tray. A second starch collecting tray 124 is placed outside the hood 51 beneath the opening 60 and elevator 40 to receive any residual starch falling in that area.

The pressure of the air entering the solenoid valve 88 (FIG. 2) is indicated by a gauge 130 and can be adjusted by valve 90 suitably to alter the pressure as required, inasmuch as this is one of the factors which determine the distance that the starch powder is projected. For cleanout purposes a blow-out fitting 132 is located at the end of the tube 72 outside the hood which will permit periodic cleaning out of tube 72 and its orifices. The starch delivery source (not shown) is also provided with an adjustment in order that the operator may vary the rate of starch delivery to the reservoir 66 through pipe 114.

It will be noted that lip 71 is positioned at some distance to the right of the axis of wheel 18. While this precise distance is a matter of choice it must be sufficient to cause an application of the powder to the ball from the beginning of its descent down the chute.

It will also be observed that following each ejection of starch dust through opening 118, no further amount of dusting material will be ejected into area A until such time as another dough ball 116 actuates flap 110 while emerging from the rounder 10, thus starting the cycle again. The cycle will be repeated each time a dough ball enters chute 16 from the rounder.

While there has been described and illustrated a specific embodiment of the invention, it will be obvious that various changes and modifications may be made therein without departing from the field of the invention which should be limited only by the scope of the appended claims.

We claim:
1. An apparatus for depositing dusting materials on balls of bread dough and comprising a closed housing having inlet and discharge openings in opposed walls for said balls and having a dusting area located between said openings, conveyor means for moving the balls from the inlet through the dusting area and out of a discharge opening, a reservoir for the material above said dusting area and a perforated tube at the bottom of the reservoir for delivering an air blast through the material to blow the material into the dusting area, a valve controlling delivery of air to the tube, a first timer switch adjustable to a fixed period during which a ball moves from the inlet opening to the dusting area, a second timer switch closed by the first switch and controlling the period of air delivery during movement of the ball through the dusting area, a switch at the inlet opening and arranged to be closed when contacted by a ball entering the same and controlling operation of the first timer switch, and a circuit including said switches and the valve.

2. The apparatus defined in claim 1 wherein the reservoir is provided with an opening adjacent the inlet opening to permit some of the dusting material to contact the ball as it enters the housing.

3. The apparatus defined in claim 1 wherein the conveyor means include means for imparting rolling action to the balls during passage through the dusting area.

4. A dusting apparatus for balls of bread dough and comprising a closed housing having inlet and discharge openings in opposed walls for said balls, a first rotary conveyor, an inclined chute for delivering said balls successively from the inlet opening to the first conveyor, a second rotary conveyor on which the balls are received from the first conveyor and providing a dusting area between the conveyors, both of said conveyors having contoured surfaces for imparting rolling action to each ball, a substantially U-shaped reservoir for dusting material above said area with one side extending to the top of the housing and with the other side communicating with the dusting area, and a perforated air tube at the bottom of the reservoir for delivering an air blast through the material to blow the material into the dusting area, a solenoid valve controlling delivery of air to the tube, a first timer switch adjustable to a fixed period during which a ball rolls down the chute to the first conveyor, a second timer switch closed by the first switch and controlling the period of air delivery, a switch arranged to be closed when contacted by a ball entering the chute and controlling operation of the first timer switch, a circuit including said switches and the valve, and means for driving the conveyors.

5. The structure recited in claim 4 wherein a vertically adjustable partition extends downwardly into the reservoir area on the side of the tube opposite the open side of the reservoir.

6. The structure recited in claim 4 wherein means are provided for feeding dusting material to the reservoir through the top wall of the housing.

7. In a dough ball dusting machine having a first rotary conveyor for receiving a single ball of dough and a second rotary conveyor for receiving said ball, both of said conveyors having contoured surfaces for imparting rolling action to each ball, and a closed housing enclosing the conveyor and having opposed inlet and discharge openings for the balls, the combination of an inclining chute down which the ball rolls to the first conveyor, a normally open switch at the upper end of the chute which is closed by contact with the entering ball, a substantially U-shaped reservoir for the dusting material above the conveyor, one leg of which extends to the upper end of the housing and whose other leg is shorter and is spaced from said end, an air delivery tube at the bottom of the reservoir, a solenoid valve controlling operation of air delivered to the tube, a first timer switch arranged to be closed by the normally open switch for an adjusted time interval necessary for travel of the ball down the chute to the first conveyor, a second timer switch arranged to be closed by the first switch at the end of said interval and electrically connected with said valve, and a circuit including said switches and said valve.

References Cited in the file of this patent
UNITED STATES PATENTS

| | | |
|---|---|---|
| 1,771,495 | La Rue | July 29, 1930 |
| 2,289,986 | Nelson | July 14, 1942 |
| 2,456,342 | Trevor | Dec. 14, 1948 |
| 2,467,989 | Porch | Apr. 19, 1949 |
| 2,754,795 | Enssle | July 17, 1956 |
| 2,907,299 | Weiner | Oct. 6, 1959 |
| 2,971,492 | Enssle | Feb. 14, 1961 |